United States Patent
Uemura

(10) Patent No.: US 8,757,223 B2
(45) Date of Patent: Jun. 24, 2014

(54) HYDROGEN FILLING APPARATUS AND HYDROGEN FILLING METHOD

(75) Inventor: Takuro Uemura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 989 days.

(21) Appl. No.: 12/792,894

(22) Filed: Jun. 3, 2010

(65) Prior Publication Data

US 2010/0307636 A1    Dec. 9, 2010

(30) Foreign Application Priority Data

Jun. 9, 2009   (JP) .................. 2009-138623

(51) Int. Cl.
F17C 5/00    (2006.01)
F17C 5/06    (2006.01)

(52) U.S. Cl.
CPC ............. F17C 5/06 (2013.01); *F17C 2250/043* (2013.01); *F17C 2250/0439* (2013.01)
USPC .................... 141/95; 141/4; 141/83; 141/197

(58) Field of Classification Search
CPC ................. F17C 5/06; F17C 2221/012; F17C 2223/0123; F17C 2250/043; F17C 2250/439; F17C 2223/036; F17C 2225/0123; F17C 2265/065; F17C 2270/0168; F17C 3/02
USPC ................. 141/4, 39, 82, 83, 94, 95
See application file for complete search history.

(56) References Cited

U.S. PATENT DOCUMENTS

| | | | | |
|---|---|---|---|---|
| 4,527,600 A | * | 7/1985 | Fisher et al. ...................... | 141/4 |
| 4,813,461 A | * | 3/1989 | Fanshawe et al. ................ | 141/4 |
| 5,259,424 A | * | 11/1993 | Miller et al. ...................... | 141/4 |
| 5,570,729 A | * | 11/1996 | Mutter ............................. | 141/18 |
| 5,628,349 A | * | 5/1997 | Diggins et al. .................... | 141/3 |
| 5,810,058 A | * | 9/1998 | Kountz et al. .................... | 141/83 |
| 6,619,336 B2 | * | 9/2003 | Cohen et al. ..................... | 141/83 |
| 6,672,340 B2 | * | 1/2004 | Mutter ............................. | 141/4 |
| 6,708,573 B1 | * | 3/2004 | Cohen et al. ..................... | 73/865 |
| 6,786,245 B1 | * | 9/2004 | Eichelberger et al. ............ | 141/4 |

(Continued)

FOREIGN PATENT DOCUMENTS

| | | |
|---|---|---|
| JP | 2004-028211 A | 1/2004 |
| JP | 2005-201340 A | 7/2005 |
| JP | 2007-138973 | 6/2007 |
| JP | 2007-309375 | 11/2007 |

OTHER PUBLICATIONS

Japanese Office Action application No. 2009-138623 dated Apr. 2, 2013.

(Continued)

*Primary Examiner* — Timothy L Maust
*Assistant Examiner* — Robert Bell, III
(74) *Attorney, Agent, or Firm* — Squire Sanders LLP

(57) ABSTRACT

A hydrogen filling apparatus fills a hydrogen tank, for example, mounted on a fuel cell vehicle with hydrogen stored in a hydrogen storage tank. After the hydrogen tank has started to be filled with hydrogen in a hydrogen filling process, the hydrogen filling process is stopped for a predetermined time, and a temperature and a pressure in the hydrogen tank are detected while the hydrogen filling process is being stopped. Thereafter, a time needed to fill the hydrogen tank with a predetermined amount of hydrogen is calculated based on detected values of the temperature and the pressure, and the calculated time is displayed on a display unit.

5 Claims, 5 Drawing Sheets

(56) References Cited

U.S. PATENT DOCUMENTS

| | | | |
|---|---|---|---|
| 7,059,364 B2* | 6/2006 | Kountz et al. | 141/4 |
| 7,178,565 B2* | 2/2007 | Eichelberger et al. | 141/47 |
| 8,286,670 B2* | 10/2012 | Faudou et al. | 141/4 |
| 8,360,112 B2* | 1/2013 | Allidieres et al. | 141/4 |
| 2010/0024542 A1* | 2/2010 | Yen et al. | 73/290 R |
| 2010/0245098 A1* | 9/2010 | Kanie | 340/632 |
| 2011/0022337 A1* | 1/2011 | Macron et al. | 702/55 |
| 2011/0259469 A1* | 10/2011 | Harty et al. | 141/4 |
| 2012/0227864 A1* | 9/2012 | Mori | 141/95 |
| 2012/0267002 A1* | 10/2012 | Kittilsen et al. | 141/4 |
| 2013/0014854 A1* | 1/2013 | Mori | 141/1 |
| 2013/0014855 A1* | 1/2013 | Yahashi et al. | 141/1 |
| 2013/0037165 A1* | 2/2013 | Okawachi et al. | 141/4 |

OTHER PUBLICATIONS

Office Action mailed Sep. 24, 2013, issued in corresponding Japanese Application No. 2009-138623 (with partial English translation).

* cited by examiner

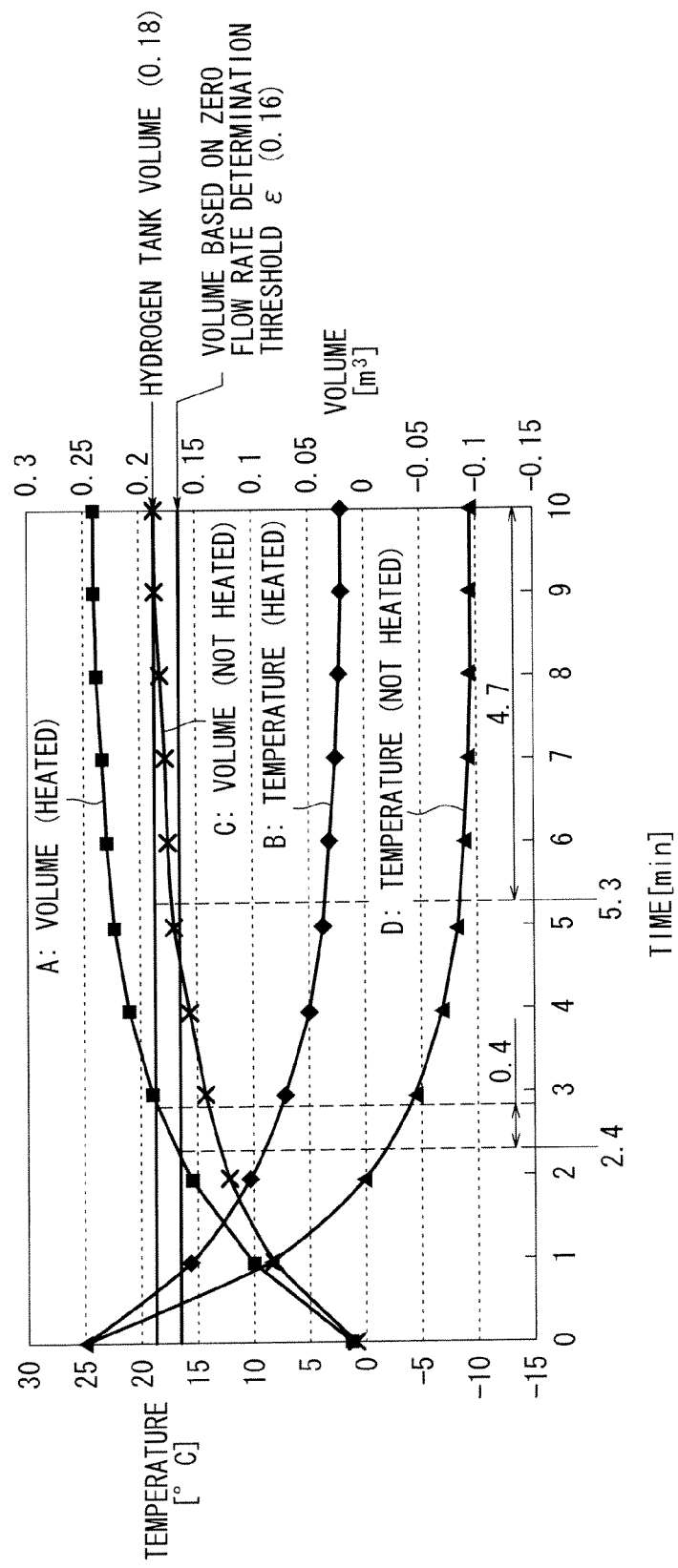

HYDROGEN FILLING APPARATUS AND HYDROGEN FILLING METHOD

CROSS-REFERENCE TO RELATED APPLICATION

This application is based upon and claims the benefit of priority from Japanese Patent Application No. 2009-138623 filed on Jun. 9, 2009, of which the contents are incorporated herein by reference.

BACKGROUND OF THE INVENTION

1. Field of the Invention

The present invention relates to a hydrogen filling apparatus and a hydrogen filling method for filling a hydrogen tank with hydrogen to be supplied to a fuel cell or the like.

2. Description of the Related Art

Fuel cells for generating electrical energy by way of an electrochemical reaction between hydrogen and oxygen are supplied with hydrogen (hydrogen gas) as a fuel from a hydrogen tank. The hydrogen tank stores hydrogen under a predetermined high pressure and is located near the fuel cell. The hydrogen tank is usually filled with hydrogen supplied from a hydrogen storage tank which stores hydrogen under a higher pressure.

Japanese Laid-Open Patent Publication No. 2007-309375 discloses an apparatus capable of filling a tank with a high-pressure gas such as a hydrogen gas while preventing a temperature rise in the tank. Though the disclosed apparatus is advantageous in that it can reduce the time required to fill the tank with the high-pressure gas because the temperature of the tank is prevented from increasing, the operator finds it hard to recognize the time needed to complete the filling process.

Japanese Laid-Open Patent Publication No. 2007-138973 also discloses a method of measuring, per given time, a change in a physical quantity such as the flow rate or pressure of filling hydrogen when a hydrogen storage alloy container is filled with hydrogen, approximating the measured change with an approximate expression, and calculating a predicted time until the completion of the filling process according to the approximate expression.

According to the method disclosed in Japanese Laid-Open Patent Publication No. 2007-138973, the predicted time until the completion of the filling process is calculated based on a given physical quantity such as the flow rate or pressure of filling hydrogen in the filling process. As the physical quantity tends to fluctuate, the accuracy with which to calculate the predicted time until the completion of the filling process is likely to decrease. Furthermore, since the filling process is continuously carried out at all times when the physical quantity is measured, if hydrogen tanks to be filled have different volumes, the accuracy with which to calculate the predicted time until the completion of the filling process becomes lower. Consequently, there has been demand for a hydrogen filling apparatus which enables an operator to recognize easily a more accurate time needed to complete the filling process for further improving its convenience for the operator.

SUMMARY OF THE INVENTION

It is an object of the present invention to provide a hydrogen filling apparatus and a hydrogen filling method which are capable of calculating and displaying a more accurate time needed to complete a hydrogen filling process when a hydrogen tank is filled with hydrogen, for thereby improving convenience for the operator.

According to the present invention, there is provided a hydrogen filling apparatus for filling a hydrogen tank with hydrogen, wherein after the hydrogen tank has started to be filled with hydrogen in a hydrogen filling process, the hydrogen filling process is stopped for a predetermined time, and a temperature and a pressure in the hydrogen tank are detected, thereafter a time needed to fill the hydrogen tank with a predetermined amount of hydrogen is calculated based on detected values of the temperature and the pressure, and the time is displayed on a display unit.

According to the present invention, there is also provided a hydrogen filling method for filling a hydrogen tank with hydrogen, comprising steps of starting to fill the hydrogen tank with hydrogen in a hydrogen filling process, thereafter stopping the hydrogen filling process for a predetermined time and detecting a temperature and a pressure in the hydrogen tank, thereafter resuming the hydrogen filling process, and calculating a time needed to fill the hydrogen tank with a predetermined amount of hydrogen based on detected values of the temperature and the pressure, after the hydrogen filling process is resumed.

With above arrangement, after the hydrogen tank has started to be filled with hydrogen, the hydrogen filling process is temporarily stopped, and the time needed to fill the hydrogen tank is calculated based on the temperature and the pressure that are detected while the hydrogen filling process is being temporarily stopped. Therefore, the time needed to fill the hydrogen tank can be calculated depending on the temperature and the pressure detected while the hydrogen filling process is being temporarily stopped, and thus the time can be calculated more accurately. Further, the calculated time is displayed on the display unit, so that it is visualized in real time for the operator. Therefore, the hydrogen filling apparatus is more convenient to use.

The hydrogen filling process may include an initial filling stage before the hydrogen filling process is stopped for the predetermined time and a normal filling stage in which the hydrogen filling process is resumed after the temperature and the pressure are detected while the hydrogen filling process is being stopped. Thus, the temperature and the pressure in the hydrogen tank can easily be measured while the hydrogen filling process is being stopped between the initial filling stage and the normal filling stage.

The hydrogen filling apparatus may include a hydrogen storage tank for storing hydrogen to be charged into the hydrogen tank, and a heating device for heating the hydrogen storage tank when the temperature of the hydrogen storage tank drops below a predetermined temperature. In this case, the heating device is capable of preventing a pipe joint of the hydrogen storage tank from suffering an undue temperature drop in the hydrogen filling process, making it possible to discharge hydrogen from the hydrogen storage tank under a higher pressure. Therefore, the time required to fill the hydrogen tank can be shortened.

A pre-filling pressure in the hydrogen tank may be detected before the hydrogen tank starts to be filled with hydrogen, and a hydrogen leakage from the hydrogen tank may be detected based on the pre-filling pressure and the detected values of the temperature and the pressure, and is displayed on the display unit. Consequently, a hydrogen leakage from the hydrogen tank can quickly be detected and indicated to the operator reliably.

Alternatively, a pre-filling temperature and a pre-filling pressure in the hydrogen tank may be detected before the hydrogen tank starts to be filled with hydrogen, a volume of the hydrogen tank may be calculated based on the pre-filling temperature, the pre-filling pressure, and the detected values, and the time is calculated based on the calculated volume and a hydrogen flow rate. With this arrangement, the time needed to fill the hydrogen tank can be calculated accurately depending on the actual volume of the hydrogen tank. The hydrogen filling apparatus is highly convenient and versatile to use, as it can quickly and accurately calculate the time needed to fill the hydrogen tank even if the hydrogen tank has different volumes and remaining volumes for different vehicles.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a graph showing time-dependent change in the filled volume at the time hydrogen is charged into a hydrogen tank from a hydrogen storage tank by the hydrogen filling apparatus and time-dependent change in the temperature of a pipe joint including the fitting of the hydrogen storage tank.

DESCRIPTION OF THE PREFERRED EMBODIMENTS

A hydrogen filling method according to a preferred embodiment of the present invention in relation to a hydrogen filling apparatus for carrying out the hydrogen filling method will be described in detail below with reference to the accompanying drawings.

Figure 1:
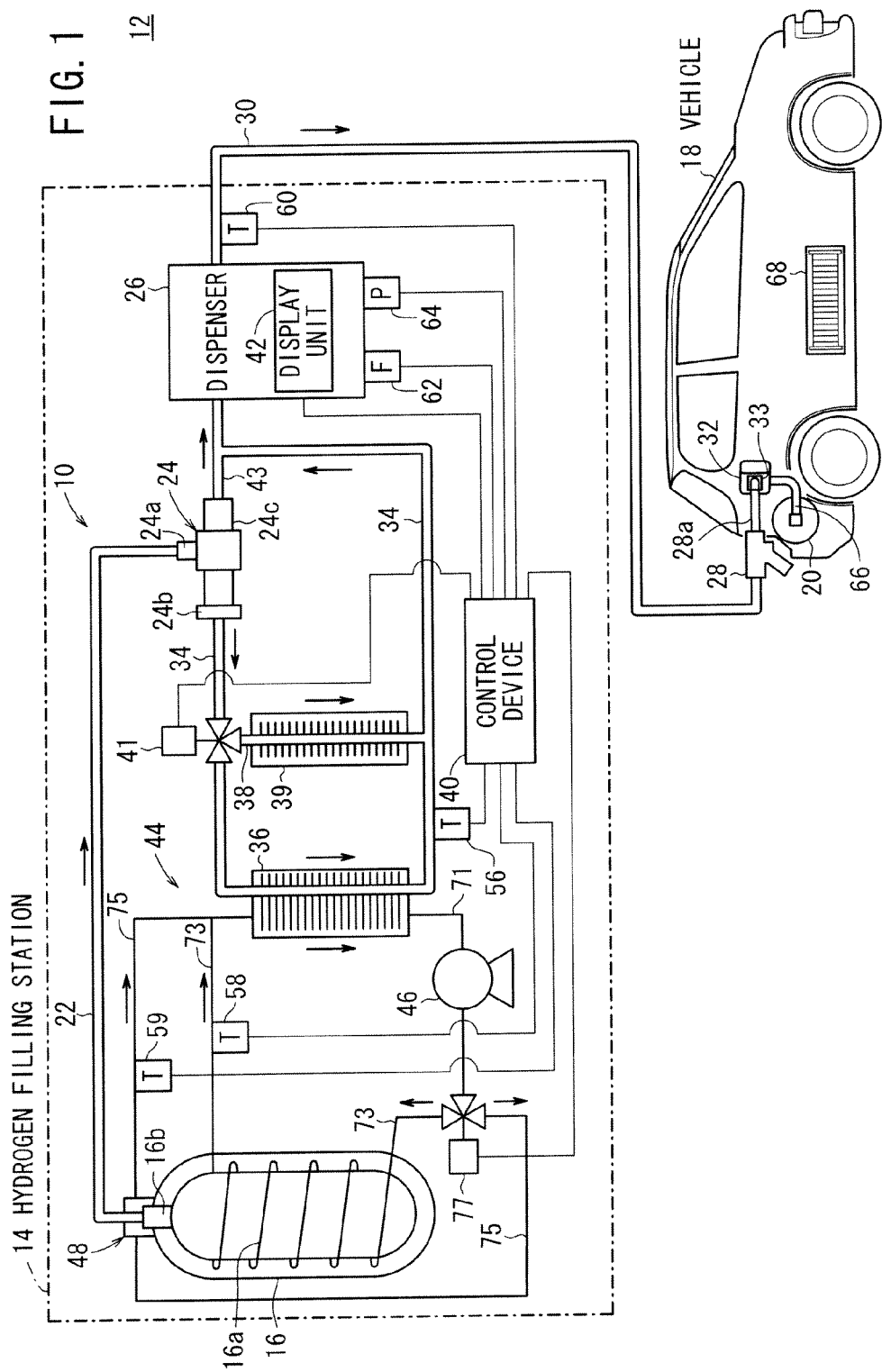
FIG. 1 is a schematic diagram of a hydrogen filling system incorporating a hydrogen filling apparatus according to an embodiment of the present invention.

FIG. 1 is a schematic diagram of a hydrogen filling system 12 incorporating a hydrogen filling apparatus 10 according to an embodiment of the present invention. In FIG. 1, the dual lines represent a piping through which hydrogen (hydrogen gas) flows, the thicker solid lines a coolant piping through a coolant as a heat medium flows, and the thinner solid lines signal lines.

The hydrogen filling system 12 serves as a system for filling, using the hydrogen filling apparatus 10, a hydrogen tank 20 mounted on a fuel cell vehicle 18 with high-pressure hydrogen (hydrogen gas) that is stored in a hydrogen storage tank 16 in a hydrogen filling station 14. The hydrogen storage tank 16 may comprise a cradle of hydrogen containers, for example.

As shown in FIG. 1, the hydrogen filling station 14 includes, in addition to the hydrogen storage tank 16, the hydrogen filling apparatus 10 which fills the hydrogen tank 20 on the fuel cell vehicle 18 with hydrogen that is stored under high pressure in the hydrogen storage tank 16.

The hydrogen storage tank 16 and the hydrogen filling apparatus 10 are connected to each other by a pipe 22 which extends from a fitting 16b of the hydrogen storage tank 16 to an inlet 24a of a vortex tube 24 of the hydrogen filling apparatus 10. The vortex tube 24 has a low-temperature outlet 24c connected to a nozzle 28 through a dispenser 26.

The nozzle 28 has an end connected to the dispenser 26 by a pipe (hydrogen supply tube) 30 and another end detachably connected to a filler inlet 32 of the fuel cell vehicle 18 by a filling connector 28a. When the filling connector 28a is coupled to the filler inlet 32, a lock mechanism 33 associated with the filling connector 28a and the filler inlet 32 locks the filling connector 28a and the filler inlet 32 to each other, allowing hydrogen to flow from the hydrogen filling station 14 to the fuel cell vehicle 18 via the filling connector 28a. The lock mechanism 33 is combined with a connection sensor (connection judging switch) 33a (see FIG. 2) for detecting whether the lock mechanism 33 is placed in a locked state or an unlocked state.

The dispenser 26 includes a device and a control unit, not shown, for controlling the starting and stopping of a filling process of supplying hydrogen to the hydrogen tank 20 on the fuel cell vehicle 18 and the flow rate of hydrogen, and a display unit 42 (see also FIG. 3) for displaying various items of information including a time needed to complete the filling process (hereinafter also referred to as a remaining time), to be described below, under the control of a control device 40. The control device 40 may be incorporated in the dispenser 26. The display unit 42 may be separate from the dispenser 26.

The dispenser 26 includes a nozzle holder, not shown, for holding the nozzle 28 detachably thereon. Usually, i.e., when the hydrogen filling process is not performed, the nozzle 28 is held by the nozzle holder. When the hydrogen filling process is performed, the nozzle 28 is detached from the nozzle holder and connected to the filler inlet 32 of the fuel cell vehicle 18 by the operator.

The vortex tube 24 serves to separate hydrogen flowing thereinto from the inlet 24a via the pipe 22 into a high-temperature gas (hot gas: high-temperature hydrogen gas) and a low-temperature gas (cold gas: low-temperature hydrogen gas). The hydrogen filling apparatus 10 also includes a first heat exchanger 36 connected to a pipe 34 extending from a high-temperature outlet 24b of the vortex tube 24, and a second heat exchanger 39 connected to a bypass pipe 38 which extends from the pipe 34 in bypassing relation to the first heat exchanger 36. The bypass pipe 38 branches from the pipe 34 through a three-way valve 41. To the low-temperature outlet 24c of the vortex tube 24, there is connected a pipe 43. The pipe 43 and the pipe 34 which extends from the outlets of the first heat exchanger 36 and the second heat exchanger 39 join together, and thereafter the pipe 43 is connected to the dispenser 26. The vortex tube 24 is of a known structure and will not be described in detail below.

The hydrogen filling apparatus 10 includes a heating device (heat medium circuit) 44 for heating the hydrogen storage tank 16 with a coolant as a heat medium (e.g., an aqueous solution of ethylene glycol or water) which is circulating through the heating device 44 and heated by the heat of a high-temperature gas that is separated by the vortex tube 24.

The heating device 44 includes a circulation pump 46 for circulating the coolant, the first heat exchanger 36 for performing heat exchange between the coolant and the high-temperature gas, and a heat exchanger 16a and a fitting heater 48 in the hydrogen storage tank 16, which are successively connected by coolant pipes.

The coolant pipes include a coolant pipe 71 extending from the outlet of the first heat exchanger 36 and branched at the outlet of the circulation pump 46 into a coolant pipe 73 connected to the heat exchanger 16a and a coolant pipe 75 connected to the fitting heater 48. The coolant pipe 71 is branched into the coolant pipes 73, 75 by a three-way valve 77 which is controlled by the control device 40 to selectively direct the coolant to the coolant pipes 73, 75 and also to direct the coolant to the coolant pipes 73, 75 at the same time.

The heat exchanger 16a extends through an intermediate layer of the hydrogen storage tank 16 which is of a known three-layer structure and the heat exchanger 16a is coiled around the hydrogen storage tank 16. The heat exchanger 16a heats the hydrogen storage tank 16 in its entirety with the coolant which has been heated by the first heat exchanger 36 due to a heat exchange with the high-temperature gas.

The fitting heater 48 comprises a casing surrounding the fitting 16b of the hydrogen storage tank 16, for example, and heats the fitting 16b with the coolant. The fitting heater 48 heats a pipe connector of the hydrogen storage tank 16 which includes the fitting 16b and surrounding parts, with the coolant which has been heated by the first heat exchanger 36.

The hydrogen fitting apparatus 10 also includes temperature sensors 56, 58, 59, 60 for measuring temperatures of various parts of the hydrogen filling apparatus 10 and the control device 40. The control device 40 controls operation of the three-way valves 41, 77, the circulation pump 46, the dispenser 26, etc. based on the temperatures measured by the temperature sensors 56, 58, 59, 60. The temperature sensor 56 is disposed on the pipe 34 near the outlet (secondary side) of the first heat exchanger 36. The temperature sensor 58 is disposed on the coolant pipe 73 near the outlet of the heat exchanger 16a. The temperature sensor 59 is disposed on the coolant pipe 75 near the outlet of the fitting heater 48. The temperature sensor 60 is disposed on the pipe 30 near the outlet of the dispenser 26.

The dispenser 26 has a flow rate sensor 62 and a pressure sensor 64 for measuring the flow rate and the pressure of hydrogen to be supplied to the fuel cell vehicle 18. When the filling connector 28a is coupled to the filler inlet 32, the temperature sensor 60 and the pressure sensor 64 can also detect the temperature and the pressure of hydrogen in the hydrogen tank 20 on the fuel cell vehicle 18. Alternatively, the detected information from a temperature sensor and a pressure sensor, not shown, that are disposed on the hydrogen tank 20 on the fuel cell vehicle 18 may be sent to the control device 40 by signal lines, not shown, extending along the nozzle 28 and the pipe 30.

The fuel cell vehicle 18 includes a pipe 66 extending from the filler inlet 32 to the hydrogen tank 20, the hydrogen tank (hydrogen storage container, fuel tank) 20 for storing hydrogen supplied from the hydrogen filling apparatus 10 through the filler inlet 32 and the pipe 66, and a fuel cell 68 as a driving source for the fuel cell vehicle 18. The hydrogen tank 20 supplies a hydrogen gas to the anode electrodes, not shown, of the fuel cell 68.

Figure 2:
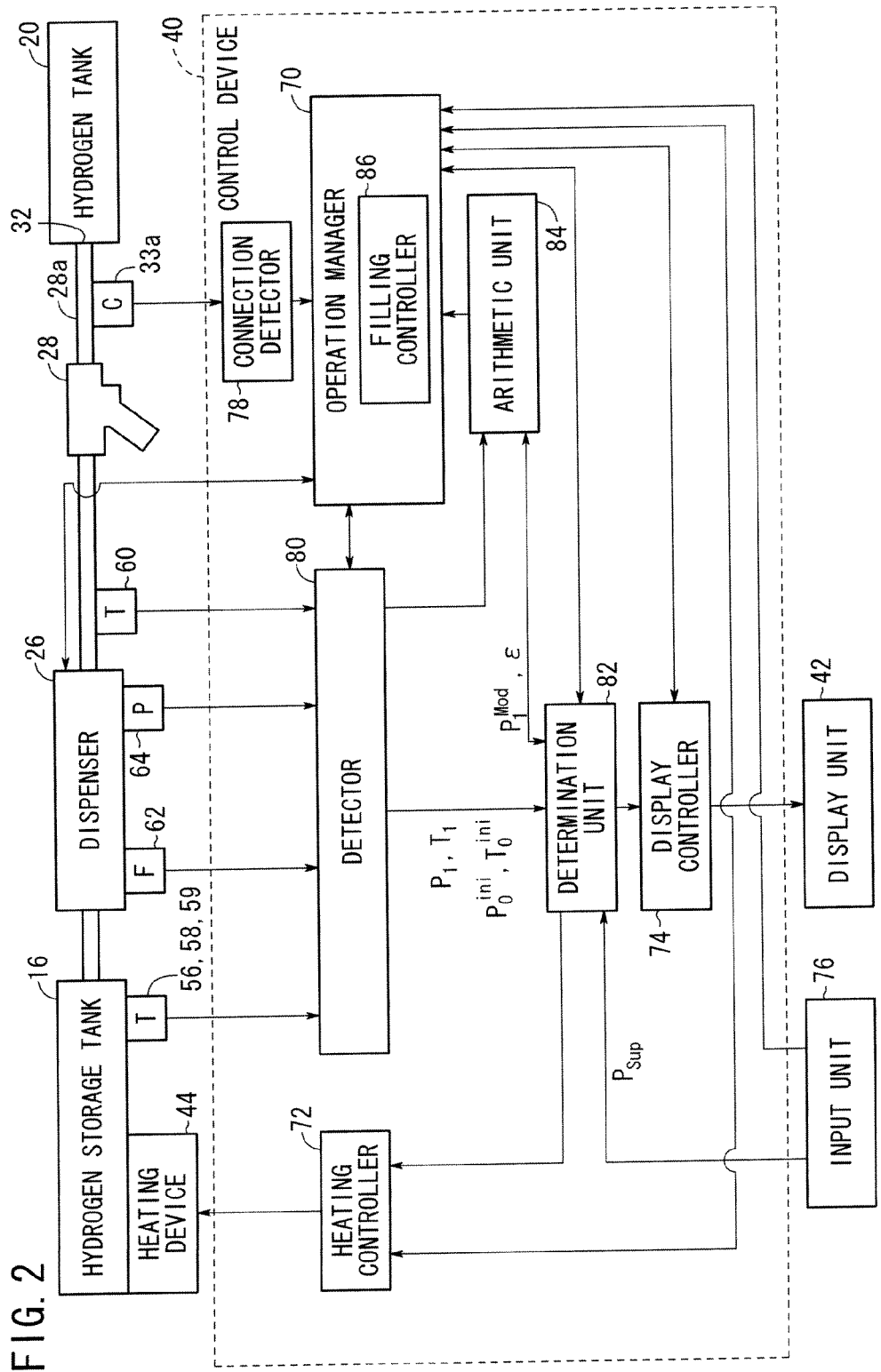
FIG. 2 is a block diagram of a control device of the hydrogen filling apparatus shown in FIG. 1.

FIG. 2 shows in block form the control device 40 of the hydrogen filling apparatus 10. As shown in FIG. 2, the control device 40 comprises an operation manager 70 for managing operation of the hydrogen filling apparatus 10, a heating controller 72 for controlling the heating device 44, a display controller 74 for controlling the display unit 42, and an input unit 76 for entering an allowable pressure (withstand pressure), etc. of the hydrogen tank 20 from outside of the control device 40. The control device 40 also includes a connection detector 78 to which an output signal is input from the connection sensor 33a, a detector 80 to which detected values (e.g., voltage values output from the sensors) are output from the pressure sensor 64, the temperature sensors 56, 58, 59, 60, and the flow rate sensor 62, a determination unit 82 for performing a predetermined determination process, for example, determining whether a filling process can be continued or not based on detected results by the detector 80, and an arithmetic unit 84 for performing predetermined arithmetic operations to calculate a time needed for a filling process, etc. based on the detected results by the detector 80 and determined results by the determination unit 82.

The operation manager 70 performs general operation management of the hydrogen filling apparatus 10 and switching control of the three-way valve 41 based on various items of information from the detector 80, the arithmetic unit 84 and the input unit 76. The operation manager 70 includes a filling controller 86 which controls the start and stop of a filling process performed by the dispenser 26. The heating controller 72 controls the heating device 44 to keep the hydrogen storage tank 16 within a predetermined temperature range based on various items of information from the detector 80 and the operation manager 70. Specifically, the heating controller 72 controls the three-way valve 77 to switch between the coolant pipes 73, 75 and also controls operation of the circulation pump 46. The detector 80 receives detected values supplied from the pressure sensor 64, the temperature sensors 56, 58, 59, 60, and the flow rate sensor 62, calculates values of a pressure (MPa), a temperature (° C.), and a flow rate (m$^3$/sec.) from the detected values, and sends the calculated values to the operation manager 70, the determination unit 82, etc. The determination unit 82 makes various determinations at various timings during the filling process, for example, as to whether a filling process is possible or not and whether a filling process is completed or not, based on the detected results from the detector 80 and the calculated results from the arithmetic unit 84, and sends the determination results to the operation manager 70 (the filling controller 86) and the heating controller 72.

Figure 3:
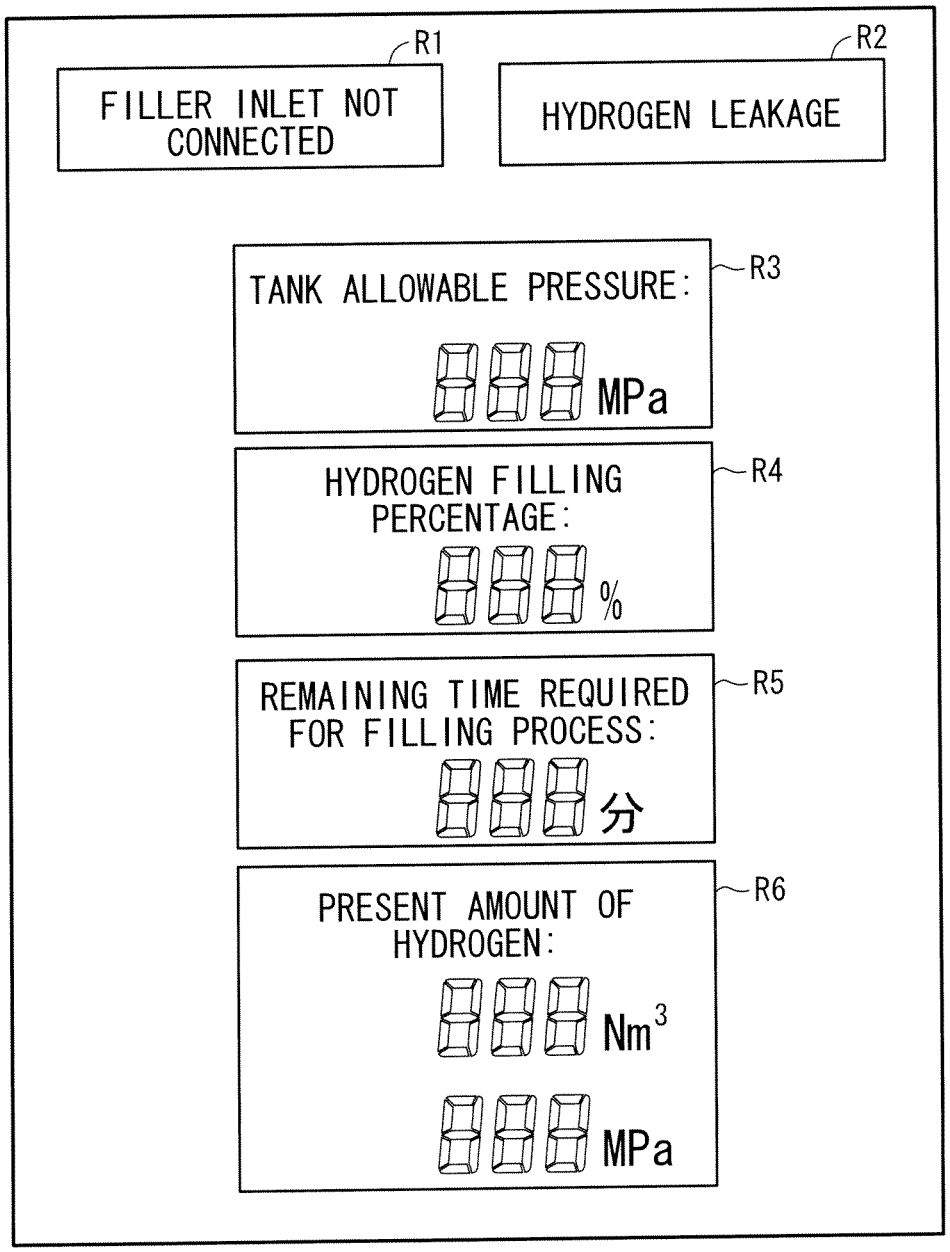
FIG. 3 is a schematic view showing a layout of various items on information displayed on a display unit of the hydrogen filling apparatus.

FIG. 3 shows a layout of various items of information displayed on the display screen of the display unit 42. The display unit 42 comprises a liquid crystal display unit, for example, and can display various items of information under the control of the display controller 74. The display screen of the display unit 42 includes a display area R1 for displaying a connected state of the filling connector 28a and the filler inlet 32, a display area R2 for displaying whether there is a hydrogen leakage or not, a display area R3 for displaying an allowable pressure (MPa) of the hydrogen tank 20, a display area R4 for displaying a hydrogen filling percentage (%) of the hydrogen tank 20, a display area R5 for displaying a time (remaining time) needed for a filling process (minutes), and a display area R6 for displaying a filled volume (Nm$^3$: normal cubic meters) and a filling pressure (MPa), as representing an amount of hydrogen being presently filled in the hydrogen tank 20. The display screen of the display unit 42 may have more display areas or less display areas, and the units in the display areas may be changed.

The hydrogen filling system 12 is basically constructed as described above. A hydrogen filling method which is carried out by the hydrogen filling apparatus 10 for filling the hydrogen tank 20 with hydrogen supplied from the hydrogen storage tank 16 will be described below with reference to a flowchart shown in FIG. 4.

First, the fuel cell vehicle 18 with the hydrogen tank 20 mounted thereon is stopped in a predetermined hydrogen filling position at the hydrogen filling station 14, and then the ignition switch is turned off to stop operation of the fuel cell 68 and other devices on the fuel cell vehicle 18. The operator then removes the nozzle 28 from the dispenser 26, and connects the filling connector 28a to the filler inlet 32 of the fuel cell vehicle 18.

Figure 4:
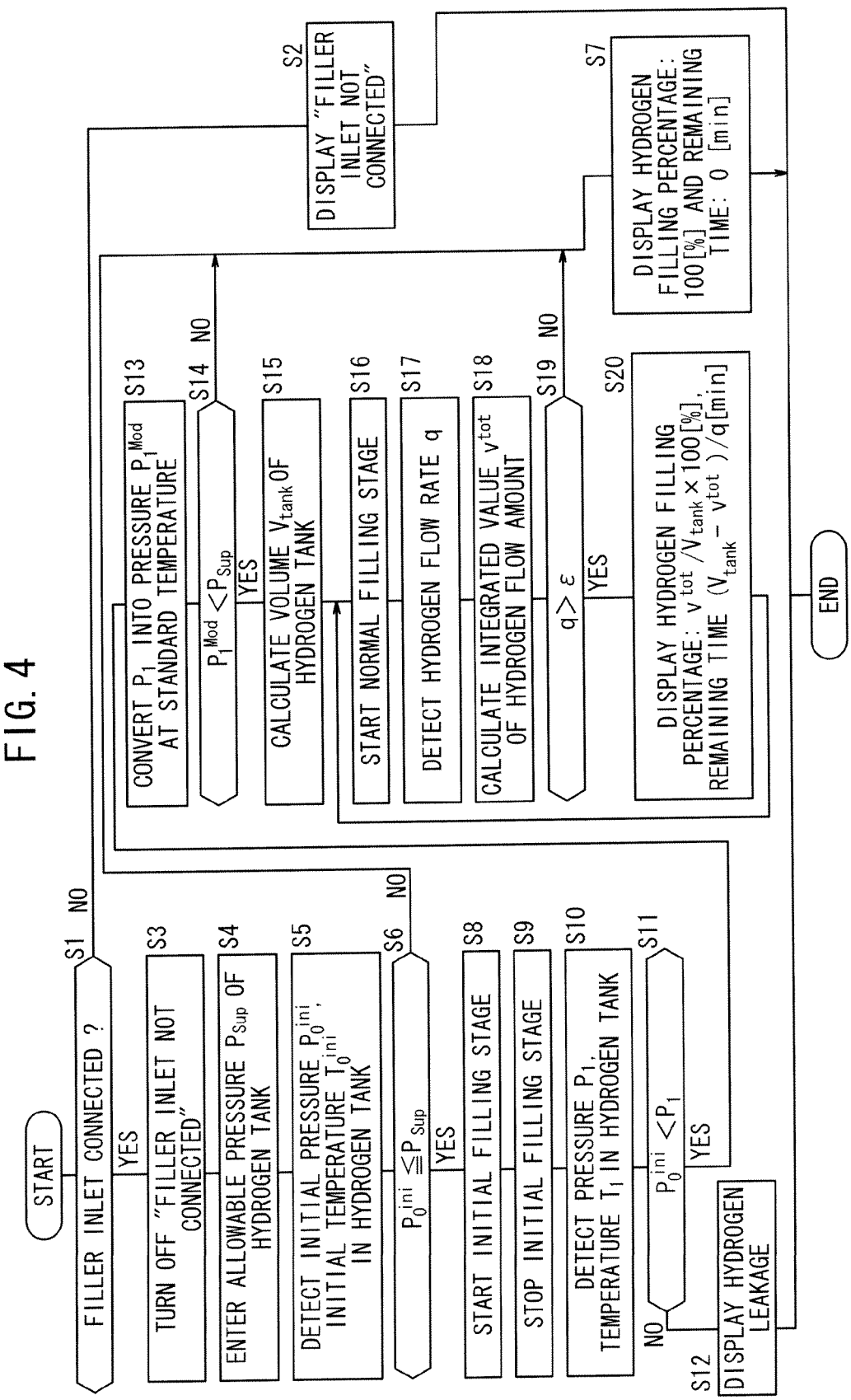
FIG. 4 is a flowchart of a hydrogen filling method carried out by the hydrogen filling apparatus.

In step S1 shown in FIG. 4, the connection sensor 33a (see FIG. 2) applies an output signal to the connection detector 78, which determines whether the lock mechanism 33 has been in a locked state or not, i.e., has connected and locked the filling connector 28a and the filler inlet 32 to each other or not, in step S1.

The connection sensor 33a supplies an output signal indicative of the determination result to the operation manager 70. If the operation manager 70 judges from the determination result that the filling connector 28a and the filler inlet 32 are not connected to each other or are suffering a connection failure ("NO" in step S1), then the display controller 74 controls the display unit 42 to display "FILLER INLET NOT CONNECTED" (see FIG. 3) in the display area R1, i.e., to turn on the display of "FILLER INLET NOT CONNECTED" in the display area R1 in step S2. If the display of "FILLER INLET NOT CONNECTED" is being turned on in the display area R1, then the display unit 42 keeps the display of "FILLER INLET NOT CONNECTED" turned on. If the operation manager 70 judges from the determination result that the filling connector 28a and the filler inlet 32 are connected to each other ("YES" in step S1), then the display controller 74 controls the display unit 42 to turn off the display of "FILLER INLET NOT CONNECTED" in the display area R1 in step S3. The display unit 42 may alternatively display "FILLER INLET CONNECTED" in addition to or instead of "FILLER INLET NOT CONNECTED".

In step S4, the operator operates the input unit 76 to set and input an allowable pressure $P_{Sup}$ (e.g., 35 MPa) of the hydrogen tank 20. The allowable pressure $P_{Sup}$ represents an allowable filling pressure (withstand pressure) up to which the hydrogen tank 20 can be filled with hydrogen.

In step S5, the detector 80 detects an initial pressure (pre-filling pressure) $P_0^{ini}$ and an initial temperature (pre-filling temperature) $T_0^{ini}$ in the hydrogen tank 20, thereby measuring the remaining gas pressure and the temperature in the hydrogen tank 20 before it is filled with hydrogen (initial filling stage). Since the dispenser 26 and the hydrogen tank 20 are held in fluid communication with each other via the pipe 30, the detected values from the pressure sensor 64 and the temperature sensor 60 which are combined with the dispenser 26 are representative of the hydrogen gas pressure and the temperature in the hydrogen tank 20 before it is filled with hydrogen. Alternatively, as described above, the control device 40 may acquire the detected values from a temperature sensor and a pressure sensor, not shown, that are disposed on the fuel cell vehicle 18.

In step S6, the determination unit 82 determines whether the hydrogen tank 20 can be filled with hydrogen or not based on the allowable pressure $P_{Sup}$ set in step S4 and the initial pressure $P_0^{ini}$ detected in step S5, i.e., whether $P_0^{ini} \leq P_{Sup}$ (hydrogen-filling enable/disable determination).

If the initial pressure $P_0^{ini}$ in the hydrogen tank 20 is higher than the allowable pressure $P_{Sup}$ ("NO" in step S6), then the determination unit 82 judges that the hydrogen tank 20 cannot, i.e., does not need to, be filled with more hydrogen, and the display controller 74 controls the display unit 42 to display "HYDROGEN FILLING PERCENTAGE: 100%" in the display area R4 and "REMAINING TIME REQUIRED FOR FILLING PROCESS: 0 (MIN)" in the display area R5 (see FIG. 3) in step S7. If the initial pressure $P_0^{ini}$ in the hydrogen tank 20 is equal to or lower than the allowable pressure $P_{Sup}$ ("YES" in step S6), then the determination unit 82 judges that the hydrogen tank 20 can be filled with hydrogen. Then, in step S8, the filling controller 86 controls the dispenser 26 to start a hydrogen filling process (initial filling stage).

When the initial filling stage is started, hydrogen from the hydrogen storage tank 16 flows into the vortex tube 24. The hydrogen that has flowed into the vortex tube 24 is separated into a high-temperature gas and a low-temperature gas by the vortex tube 24. The high-temperature gas flows from the high-temperature outlet 24b into the pipe 34. The low-temperature gas flows from the low-temperature outlet 24c into the pipe 43, and then flows from the pipe 43 through the dispenser 26, the pipe 30, the nozzle 28, and the filler inlet 32 into the hydrogen tank 20 on the fuel cell vehicle 18.

The initial filling stage in step S8 continues only for a preset period of time, e.g., a few seconds immediately after the filling process to the hydrogen tank 20 has been started, under the control of the filling controller 86. After elapse of the preset period of time, the filling controller 86 (temporarily) stops filling the hydrogen tank 20 with hydrogen in step S9.

While the filling process is being stopped in step S9, the detector 80 detects a pressure $P_1$ and a temperature $T_1$ in the hydrogen tank 20, thereby measuring the gas pressure and the temperature in the hydrogen tank 20 after the initial filling stage in step S10.

In step S11, the determination unit 82 determines whether the pressure $P_1$ developed in the hydrogen tank 20 by the initial filling stage has increased from the pre-filling pressure or not, i.e., whether $P_0^{ini} < P_1$ or not, based on the initial pressure $P_0^{ini}$ detected in step S5 and the pressure $P_1$ detected in step S10, in order to determine whether there is a hydrogen leakage or not (hydrogen-leakage detection).

If the pressure $P_1$ developed in the hydrogen tank 20 by the initial filling stage is equal to or lower than the initial pressure $P_0^{ini}$ ("NO" in step S11), then the determination unit 82 judges that there is possibly a hydrogen leakage from various devices including the hydrogen tank 20 and pipe joints. In step S12, the display controller 74 controls the display unit 42 to display "HYDROGEN LEAKAGE" (see FIG. 3) in the display area R2. If the pressure $P_1$ is higher than the initial pressure $P_0^{ini}$ ("YES" in step S11), then the determination unit 82 judges that there is no hydrogen leakage. In step S13, the arithmetic unit 84 performs a conversion process for converting the pressure $P_1$ into a pressure $P_1^{Mod}$ at a standard temperature of 25° C., for example. The conversion process is carried out based on a known formula such as the gas equation of state (PV=NRT where N represents the number of moles and R the gas constant), for example.

In step S14, the determination unit 82 determines whether the hydrogen tank 20 can be filled with more hydrogen or not based on the allowable pressure $P_{Sup}$ set in step S4 and the pressure $P_1^{Mod}$ calculated in step S13, i.e., whether $P_1^{Mod} < P_{Sup}$ or not (hydrogen-filling enable/disable determination).

If the pressure $P_1^{Mod}$ in the hydrogen tank 20 is equal to or higher than the allowable pressure $P_{Sup}$ ("NO" in step S14), then the determination unit 82 judges that the hydrogen tank 20 cannot, i.e., does not need to, be filled with more hydrogen, and then control goes to step S7. If the pressure $P_1^{Mod}$ is lower than the allowable pressure $P_{Sup}$ ("YES" in step S14), then the determination unit 82 judges that the hydrogen tank 20 can be filled with more hydrogen. Then, control goes to step S15.

In step S15, the arithmetic unit 84 calculates a volume $V_{tank}$ of the hydrogen tank 20. The volume $V_{tank}$ can be calculated as follows:

A gas N (moles) having a pressure P (atm), a temperature T (K), and a volume V (l) satisfies the following equations (1), (2):

$$P = \frac{NRT}{V - bN} - a\left(\frac{N}{V}\right)^2 \quad (1)$$

$$= \frac{RT}{\frac{V}{N} - b} - a\left(\frac{N}{V}\right)^2$$

$$\therefore dP = \frac{R}{\frac{V}{N} - b} dT + \left\{ RT \cdot \frac{\frac{V}{N^2}}{\left(\frac{V}{N} - b\right)^2} - \frac{2a}{V^2} N \right\} dN \quad (2)$$

$$= \frac{R}{\frac{V}{N} - b} dT + \left\{ \frac{RT}{V} \cdot \frac{\left(\frac{V}{N}\right)^2}{\left(\frac{V}{N} - b\right)^2} - \frac{2a}{N}\left(\frac{N}{V}\right)^2 \right\} dN$$

$$= \frac{R}{\frac{V}{N} - b} dT + \frac{1}{V} \left\{ \frac{RT\left(\frac{V}{N}\right)^2}{\left(\frac{V}{N} - b\right)^2} - 2a\left(\frac{V}{N}\right) \right\} dN$$

where $a[\text{atm} \cdot l^2 \cdot \text{mol}^{-2}] = 0.245$, $b[l \cdot \text{mol}^{-1}] = 2.67 \times 10^{-2}$ In a first calculation step, the initial pressure $P_0^{ini}$ and the initial temperature $T_0^{ini}$ in the hydrogen tank 20 which have been detected in step S5 are substituted into the equation (1) to calculate a ratio V/N of the number N of moles of the gas (hydrogen gas) in the hydrogen tank 20 and the tank volume V before the filling process is performed, according to the equation (1).

In a second calculation step, a volume $v_{ini}$ of hydrogen that has flowed into the hydrogen tank 20 during the initial filling stage in step S8 is substituted into the equation (1) to calculate the amount dN (mol) of hydrogen that has flowed into the hydrogen tank 20 according to the equation (1). The volume $v_{ini}$ is calculated by detecting the output signal from the flow rate sensor 62 with the detector 80 and processing the detected output signal with a time required for the initial filling stage, i.e., a time consumed from the start of the initial filling stage in step S8 to the end of the initial filling stage in step S9. By substituting the volume $v_{ini}$, the initial pressure $P_0^{ini}$, and the initial temperature $T_0^{ini}$ into the parameters V, P, T of the equation (1), the arithmetic unit 84 calculates an increase in the amount of hydrogen when the volume $v_{ini}$ of hydrogen has flowed into the hydrogen tank 20, i.e., the amount dN (mol) of hydrogen.

In a third calculation step, based on the pressure $P_1$ and the temperature $T_1$ in the hydrogen tank 20 which are detected in step S10 while the filling of the hydrogen tank 20 with hydrogen is being temporarily stopped, $dP = P_1 - P_0^{ini}$, $dT = T_1 - T_0^{ini}$, dN (calculated in the second calculation step), and V/N (calculated in the first calculation step) are substituted into the equation (2), and the equation is solved for V to calculate the volume $V_{tank}$ of the hydrogen tank 20.

In step S16 shown in FIG. 4, the hydrogen filling process is started again in a normal filling stage of the hydrogen filling process. In the normal filling stage, hydrogen from the hydrogen storage tank 16 is supplied through the dispenser 26, the nozzle 28, and the filler inlet 32 into the hydrogen tank 20 on the fuel cell vehicle 18 under the control of the filling controller 86.

At this time, the three-way valve 41 is shifted to select the first heat exchanger 36 under the control of the operation manager 70 and the heating controller 72. Therefore, the high-temperature gas from the high-temperature outlet 24b of the vortex tube 24 flows into the first heat exchanger 36. The circulation pump 46 of the heating device 44 is actuated to circulate the coolant through the first heat exchanger 36, which performs heat exchange between the high-temperature gas and the coolant. Specifically, the high-temperature gas is cooled by the coolant, and the coolant is heated by the high-temperature gas.

The high-temperature gas that has been cooled by the coolant in the first heat exchanger 36 joins the low-temperature gas flowing through the pipe 43, and then flows through the dispenser 26 and the nozzle 28 into the hydrogen tank 20. The coolant that has been heated by the high-temperature gas in the first heat exchanger 36 flows into the heat exchanger 16a or the fitting heater 48 through the three-way valve 77 that is controlled by the heating controller 72 based on the detected values from the temperature sensors 58, 59. Therefore, when the hydrogen filling process is performed, the hydrogen storage tank 16 and the fitting 16b thereof are heated suitably and hence prevented from being unduly cooled with hydrogen that quickly flows out of the hydrogen storage tank 16.

In the normal filling stage, the detected values of the temperature sensors 56, 58, 59 are monitored. If one or more of the temperatures detected by the temperature sensors 56, 58, 59 becomes equal to or higher than a predetermined level, i.e., if the hydrogen storage tank 16 does not need to be heated anymore, then the heating device 44 is inactivated, and the three-way valve 41 is shifted to select the bypass pipe 38. The high-temperature gas flowing from the high-temperature outlet 24b is now delivered through the bypass pipe 38 into the second heat exchanger 39, which radiates the heat of the high-temperature gas. Accordingly, the hydrogen storage tank 16 is prevented from being excessively heated, and the high-temperature gas is prevented from being insufficiently cooled. Incidentally, the initial filling stage in step S8 continues for only a short time of a few seconds, and causes only a slight temperature change due to the hydrogen filling. Accordingly, during the initial filling stage, the heating device 44 may be inactivated and hence may not cause an undue electric power consumption.

In step S17, the detector 80 acquires the detected value from the flow rate sensor 62 thereby to detect a hydrogen flow rate (hydrogen filling rate) q (l/sec) at which hydrogen flows per unit time into the hydrogen tank 20 in the normal filling stage. Then, in step S18, the arithmetic unit 84 calculates an integrated value $v^{tot}$ (l) of the amount of hydrogen flowing into the hydrogen tank 20 based on the detected hydrogen flow rate q and a hydrogen filling time since the normal filling stage (step S16) has started.

In step S19, the determination unit 82 determines whether the hydrogen flow rate is substantially zero and the hydrogen tank 20 is filled up to the allowable pressure $P_{Sup}$ or not, i.e., whether q>ϵ or not, based on the hydrogen flow rate q detected in step S17 and a zero flow rate determination threshold ϵ which may be preset in the filling controller 86 or which may be calculated by the arithmetic unit 84 (hydrogen-filling-completion determination).

The zero flow rate determination threshold ϵ will be described below. Usually, a gas flow rate q per unit time depends on the accuracy of a flow rate sensor used to measure the gas flow rate. The strict zero level of the gas flow rate and the zero flow rate detected by the flow rate sensor may not necessarily be in agreement with each other. If the zero flow rate detected by the flow rate sensor is set as a threshold for judging whether or not the normal filling stage is completed, then since the normal filling stage is not completed unless the detected flow rate becomes zero, it may cause an increase in the filling time.

To avoid the above drawback, according to the present embodiment, a value which is sufficiently small with respect to the volume $V_{tank}$ of the hydrogen tank 20 calculated in step S15 and which is larger than the minimum resolution of the flow rate sensor 62, e.g., a value which represents ¹⁄₇₀ (a few %) of the volume $V_{tank}$ of the hydrogen tank 20, is used as the zero flow rate determination threshold ε that has taken into account temperature drifts of the flow rate sensor 62. In other words, the zero flow rate determination threshold ε is set as a value at which the amount of hydrogen flowing into the hydrogen tank 20 is regarded as essentially zero, and below which the normal filling stage is virtually impossible or almost does not progress.

FIG. 5 is a graph showing time-dependent changes in the filled volume at the time hydrogen is charged into the hydrogen tank 20 from the hydrogen storage tank 16 by the hydrogen filling apparatus 10 and the temperature of the pipe joint including the fitting 16*b* of the hydrogen storage tank 16. In the example shown in FIG. 5, the hydrogen tank 20 has a volume of 0.18 (m³), a volume (filling-completion reference volume) based on the zero flow rate determination threshold ε is set at a volume of 0.16 (m³), and time-dependent changes in filled volume (m³) and the pipe joint temperature (° C.) are plotted when the hydrogen storage tank 16 is heated by the heating device 44 and when the hydrogen storage tank 16 is not heated by the heating device 44.

As shown in FIG. 5, irrespective of whether the hydrogen storage tank 16 is heated by the heating device 44 as indicated by the curves A, B or the hydrogen storage tank 16 is not heated by the heating device 44 as indicated by the curves C, D, the time required to reach the volume of 0.16 (m³) based on the zero flow rate determination threshold ε is shorter than the time required to reach the true volume of 0.18 (m³) of the hydrogen tank 20. When the hydrogen storage tank 16 is heated by the heating device 44, the time is reduced by about 0.4 minutes (from 2.8 minutes to 2.4 minutes), and when the hydrogen storage tank 16 is not heated by the heating device 44, the time is reduced by about 4.7 minutes (from 10 minutes to 5.3 minutes). In other words, the hydrogen tank 20 can been substantially fully-filled in a shorter time by setting the zero flow rate determination threshold ε and determining whether the amount of hydrogen flowing into the hydrogen tank 20 is zero or not based on the zero flow rate determination threshold ε (step S19). By appropriately controlling operation of the heating device 44 during the hydrogen filling process, the hydrogen filling process is completed in 5.3 minutes when the hydrogen storage tank 16 is not heated, whereas the hydrogen filling process is completed in 2.4 minutes when the hydrogen storage tank 16 is heated. Accordingly, the time required to fully-fill the hydrogen tank 20 is greatly reduced when the hydrogen storage tank 16 is heated.

In step S19 shown in FIG. 4, if the hydrogen flow rate q is smaller than the zero flow rate determination threshold ε ("NO" in step S19), then the determination unit 82 judges that the hydrogen tank 20 cannot, i.e., does not need to, be filled with more hydrogen, and that the hydrogen filling process for filling the hydrogen tank 20 is completed. Then, control goes to step S7, and the present hydrogen filling sequence is finished. If the hydrogen flow rate q is larger than the zero flow rate determination threshold ε ("YES" in step S19), then control goes to step S20.

In step S20, the arithmetic unit 84 calculates $v^{tot}/V_{tank} \times 100$ (%), and the calculated value is displayed as "HYDROGEN FILLING PERCENTAGE: %" in the display area R4 (see FIG. 3). The arithmetic unit 84 also calculates $(V_{tank} - v^{tot})/q$ (minutes), and the calculated value is displayed as "REMAINING TIME REQUIRED FOR FILLING PROCESS: (MIN)" in the display area R5 (see FIG. 3). At the same time, "PRESENT AMOUNT OF HYDROGEN" (filled volume Nm³, filling pressure MPa) is displayed in the display area R6. The filled volume Nm³ represents a volume under a pressure at the standard temperature of 25° C., for example.

After step S20, control goes back to step S16 to continue the normal filling stage. The hydrogen filling percentage and the time (remaining time) needed to complete the filling process are displayed as needed on the display unit 42 to allow the operator to know various items of information until the completion of the hydrogen filling process.

With the hydrogen filling apparatus 10 according to the present embodiment, as described above, after the hydrogen tank 20 mounted on the fuel cell vehicle 18 has started to be filled with hydrogen, the hydrogen filling process (initial filling stage) is stopped for a certain time, and the temperature $T_1$ and the pressure $P_1$ in the hydrogen tank 20 are detected. The arithmetic unit 84 calculates a time needed to fill the hydrogen tank 20 with a certain amount of hydrogen (tank volume $V_{tank}$) based on the detected temperature $T_1$ and pressure $P_1$, and displays the calculated time on the display unit 42. In other words, since the hydrogen filling process is temporarily stopped, and the time needed to fill the hydrogen tank 20 is calculated based on the temperature and the pressure detected while the hydrogen filling process is being temporarily stopped, the time needed to fill the hydrogen tank 20 with a certain amount of hydrogen can be calculated accurately depending on the temperature and the pressure detected while the hydrogen filling process is being temporarily stopped. The calculated time and other data representative of the hydrogen-filled state of the hydrogen tank 20 are displayed on the display unit 42, so that they are visualized in real time for the operator. Therefore, the hydrogen filling apparatus 10 is highly convenient to use.

It is preferable to detect the initial pressure $P_0^{ini}$ and the initial temperature $T_0^{ini}$ in the hydrogen tank 20 before the hydrogen tank 20 starts to be filled with hydrogen, calculate the volume $V_{tank}$ of the hydrogen tank 20 based on the detected values of the initial pressure $P_0^{ini}$ and the initial temperature $T_0^{ini}$ and the detected values when the hydrogen filling process is temporarily stopped, and calculate the time needed to fill the hydrogen tank 20 based on the calculated volume $V_{tank}$ of the hydrogen tank 20 and the hydrogen flow rate q (integrated value $v^{tot}$). In other words, the time needed to fill the hydrogen tank 20 is calculated using the volume of the hydrogen tank calculated based on the temperature and the pressure which are detected while the hydrogen filling process is temporarily stopped. The time needed to fill the hydrogen tank 20 can thus be calculated accurately depending on the actual volume of the hydrogen tank. The hydrogen filling apparatus 10 is highly convenient and versatile to use, because it can quickly and accurately calculate the time needed to fill the hydrogen tank 20 even if the hydrogen tank 20 has different volumes and remaining volumes for different vehicles.

The hydrogen filling apparatus 10 performs the hydrogen filling process in the initial filling stage and the normal filling stage. While the hydrogen filling process is being stopped between the initial filling stage and the normal filling stage, the temperature and the pressure in the hydrogen tank 20 are measured, and the hydrogen filling circuit is checked for a hydrogen leakage. Therefore, the hydrogen filling apparatus 10 is highly convenient to use. If different filling conditions are required in the initial filling stage and the normal filling stage, then the heating device 44 can be optimally controlled to operate depending on those different filling conditions. Consequently, the cost required to operate the hydrogen filling apparatus 10 is reduced, and it is possible to fill the hydrogen tank 20 while saving energy.

The heating device 44 for heating the hydrogen storage tank 16 is effective to prevent the hydrogen storage tank 16 and the fitting 16b (pipe joint) thereof from being lowered in temperature during the hydrogen filling process, and to greatly reduce the charging time because the heating device 44 makes it possible to discharge a hydrogen gas from the hydrogen storage tank 16 under a higher pressure thereby for a shorter charging time. The reduced charging time and the displayed time needed to fill the hydrogen tank 20 allow the operator to use the hydrogen filling apparatus 10 more conveniently. Also, as the fitting heater 48 prevents the pipe joint from being frozen and excessively lowered in temperature, seal members and other members disposed in the pipe joint are protected against undue deterioration. In other words, those seal members and other members can have a less strict requirement for their strength at low temperatures, with the results that the hydrogen filling apparatus 10 may be manufactured less costly and more efficiently.

Although a certain preferred embodiment of the present invention has been shown and described in detail, it should be understood that various changes and modifications may be made therein without departing from the scope of the appended claims.

In the illustrated embodiment, the present invention has been illustrated as being applied to a hydrogen tank mounted on a fuel cell vehicle. However, the present invention is not limited to hydrogen tanks on fuel cell vehicles, but may be applied to hydrogen tanks in applications other than fuel cell vehicles.

Further, the vortex tube may be omitted. In this case, the heating device may include an electric heater.

What is claimed is:

1. A hydrogen filling apparatus for filling a hydrogen tank with hydrogen, the hydrogen filling apparatus comprising:
   a filling controller configured to, after the hydrogen tank has started to be filled with hydrogen in a hydrogen filling process, stop the hydrogen filling process for a predetermined time, before the hydrogen tank is filled up to a predetermined amount,
   wherein a sensor detects a temperature and a pressure in the hydrogen tank while the hydrogen filling process is stopped;
   a control device configured to calculate a timed needed to fill the hydrogen tank with the predetermined amount of hydrogen based on detected values of the temperature and the pressure; and
   a display unit configured to display the time,
   wherein the hydrogen filling process includes an initial filling stage before the hydrogen filling process is stopped for the predetermined time and a normal filling stage in which the hydrogen filling process is resumed after the temperature and the pressure are detected while the hydrogen filling process is being stopped, and wherein the initial filing stage is shorter in duration than the normal filling stage.

2. A hydrogen filling apparatus according to claim 1, comprising a hydrogen storage tank for storing hydrogen to be charged into the hydrogen tank, and a heating device for heating the hydrogen storage tank when the temperature of the hydrogen storage tank drops below a predetermined temperature.

3. A hydrogen filling apparatus according to claim 1, wherein the sensor is configured to detect a pre-filling pressure in the hydrogen tank before the hydrogen tank starts to be filled with hydrogen, wherein the control device is configured to detect a hydrogen leakage from the hydrogen tank is based on the pre-filling pressure and the detected values and wherein the displayed unit is configured to display an indication of the hydrogen leakage.

4. A hydrogen filling apparatus according to claim 1, wherein the sensor is configured to detect a pre-filling temperature and a pre-filling pressure in the hydrogen tank are detected before the hydrogen tank starts to be filled with hydrogen, wherein the control device is configured to calculate a volume of the hydrogen tank based on the pre-filling temperature, the pre-filling pressure and the detected values, and wherein the control device is configured to calculate the time based on the calculated volume and a hydrogen flow rate.

5. A hydrogen filling method for filling a hydrogen tank with hydrogen, the method comprising:
   starting to fill the hydrogen tank with hydrogen in a hydrogen filling process;
   stopping the hydrogen filling process for a predetermined time;
   detecting a temperature and a pressure in the hydrogen tank during said predetermined time when the hydrogen filling process is stopped;
   resuming the hydrogen filling process; and
   calculating q time needed to fill the hydrogen tank with a predetermined amount of hydrogen based on detected values of the temperature and the pressure, after the hydrogen filling process is resumed,
   wherein the hydrogen filling process includes an initial filling stage before the hydrogen filling process is stopped for the predetermined time and a normal filling stage in which the hydrogen filling process is resumed after the temperature and the pressure are detected while the hydrogen filling process is being stopped, and wherein the initial filling stage is shorter in duration then the normal filling stage.

* * * * *